United States Patent [19]
Groenendaal et al.

[11] 3,764,665
[45] Oct. 9, 1973

[54] COMBINED SULFUR OXIDES ACCEPTANCE-SULFUR RECOVERY PROCESS
[75] Inventors: Willem Groenendaal; Walter M. Lenz, both of The Hague, Netherlands
[73] Assignee: Shell Oil Company, New York, N.Y.
[22] Filed: Feb. 7, 1972
[21] Appl. No.: 224,103

[30] Foreign Application Priority Data
Feb. 19, 1971 Netherlands.................. 7102211

[52] U.S. Cl.............. 423/574, 423/244, 423/539, 423/576, 55/73
[51] Int. Cl............................................ C01b 17/04
[58] Field of Search.................. 423/244, 539, 574, 423/576; 55/73

[56] References Cited
UNITED STATES PATENTS
2,747,968  5/1956  Pigache........................ 423/539 X
3,645,671  2/1972  Griffin et al..................... 423/242
3,692,480  5/1971  Snoek et al..................... 423/574 X Primary Examiner—G. O. Peters
Attorney—Leonard P. Miller et al.

[57] ABSTRACT

An improved process for removing sulfur oxides from gas mixtures with a solid acceptor for sulfur oxides wherein the solid acceptor is regenerated with a steam-diluted reducing gas and the regeneration off-gas is fed to a Claus sulfur recovery process. The improvement comprises cooling the regeneration off-gas to condense the water vapor contained therein, contacting the cooled off-gas with a sulfur dioxide-selective liquid absorbent, passing the fat liquid absorbent to a buffer zone and then to a stripping zone wherein the absorbed $SO_2$ is recovered from the liquid absorbent and is supplied to the sulfur recovery process. By operating in this manner, fluctuations in the sulfur dioxide concentration of the regeneration off-gas are leveled-out and on relatively concentrated sulfur dioxide stream is supplied to the sulfur recovery process at a substantially constant rate.

10 Claims, 2 Drawing Figures

COMBINED SULFUR OXIDES ACCEPTANCE-SULFUR RECOVERY PROCESS

BACKGROUND OF THE INVENTION

The invention relates to an improved process in which sulfur oxides are accepted from gas mixtures on solid acceptors and are subsequently freed again by regeneration of these acceptors and the regeneration off-gases passed to a Claus sulfur recovery process.

Sulfur oxides can be removed from gas mixtures containing such compounds by contacting the gas mixtures at elevated temperatures with solid acceptors for sulfur oxides. Preferred acceptors are those which are capable of binding sulfur dioxide and/or sulfur trioxide as a sulfate and subsequently releasing said oxides as sulfur dioxide upon regeneration. Suitable acceptors of this type comprise a metal and/or metal compound applied to a suitable carrier.

A process as described above can be used to remove sulfur oxides from flue gases so that the latter may be freely discharged into the environment without causing air pollution. Since the acceptor used needs to be frequently regenerated, the process is generally effected according to what is known as the swing method. During regeneration a regeneration off-gas is obtained which contains an increased concentration of sulfur dioxide. This off-gas can be suitably used as a starting material for the preparation of sulfuric acid or elementary sulfur.

Elementary sulfur can be produced by means of a Claus process. In a Claus process sulfur is formed from sulfur dioxide and hydrogen sulfide, at least partly in the presence of a catalyst, according to the reaction

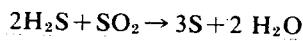

$$2H_2S + SO_2 \rightarrow 3S + 2H_2O$$

To ensure that the reaction proceeds as completely as possible and that the concentration of hydrogen sulfide and/or sulfur dioxide in the off-gases from the apparatus is kept as low as possible, it is of great importance to supply the stoichiometrically required quantities of hydrogen sulfide and sulfur dioxide to the process. However, a problem is encountered in that the regeneration off-gas from the previously described sulfur oxides acceptance process contains highly fluctuating concentrations of sulfur dioxide.

These concentrations typically vary from zero or virtually zero at the beginning and the end of the regeneration run, to a maximum value during the regeneration. For the operation of an aparatus of the Claus type together with an apparatus for the acceptance of sulfur oxides on a solid acceptor, this fluctuating sulfur dioxide concentration leads to great control difficulties as either the hydrogen sulfide concentration has to fluctuate as well or, in the case of a constant hydrogen sulfide supply, an additional sulfur dioxide supply must be provided, the quantity supplied depending on the sulfur dioxide concentration in the regeneration gas. Furthermore, for various considerations it is frequently desirable to use a reducing gas diluted with steam for regeneration of the solid acceptor. This produces additional problems, however, since the presence of steam in the regeneration off-gas gives a very poor conversion in a Claus type process. The present invention provides a means for substantially overcoming the fluctuating sulfur dioxide concentration problem while at the same time allowing the use of a steam-diluted reducing gas for effecting regeneration.

SUMMARY OF THE INVENTION

It has now been found that sulfur dioxide derived from the regeneration off-gas of a sulfur oxides acceptance process wherein the solid acceptor is regenerated with a steam-diluted reducing gas can be supplied to a Claus sulfur recovery process in an improved manner which comprises:

a. cooling the regeneration off-gas to a temperature at which a substantial part of the steam contained therein condenses, b. contacting the cooled regeneration off-gas with a sulfur-dioxide-selective liquid absorbent thereby obtaining a substantially sulfur dioxide-free regeneration off-gas and a sulfur dioxide-rich liquid absorbent, c. passing said sulfur dioxide-rich liquid absorbent into a buffer zone of such a volume that the sulfur dioxide concentration of the liquid absorbent in the buffer zone will remain substantially constant during the regeneration period of the solid acceptor, d. withdrawing a stream of sulfur dioxide-rich liquid absorbent from said buffer zone and passing it to a stripping zone, e. heating the sulfur dioxide-rich liquid absorbent to a temperature at which sulfur dioxide gas is expelled thereby regenerating the liquid absorbent, and f. recovering the expelled sulfur dioxide gas and passing it to a Claus sulfur recovery process at a substantially constant rate.

DESCRIPTION OF EMBODIMENTS

Figure 1:
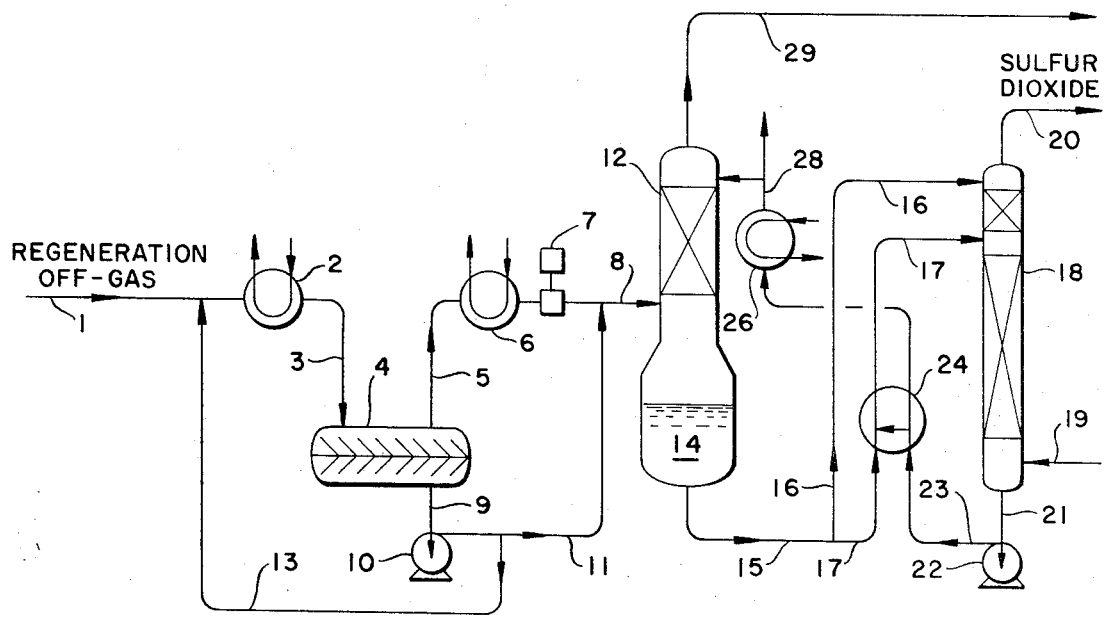
FIG. 1 is a flow diagram of an embodiment of the invention preferred when water is used as the sulfur dioxide-selective liquid absorbent.

In accordance with the present process, the regeneration off-gas from an acceptance process is preferably first cooled with the formation of a condensate after which the cooled off-gas, with or without compression is contacted with a liquid absorbent. Cooling of the regeneration off-gas to remove steam is especially desirable in those cases where the absorbent to be used is other than water. If the absorbent is water, the condensate formed can at least in part be mixed with the cooled compressed off-gas prior to contacting with the liquid absorbent. Part of the formed condensate may also be used to pre-cool the regeneration off-gas by injecting it in liquid form into the regeneration off-gas.

In addition to water, other suitable liquid absorbents include all those liquids which have both a high selectivity for sulfur dioxide and a high absorption capacity. At the same time they should have a low selectivity to carbon dioxide. Moreover, the absorbed sulfur dioxide must be easy to expel by heating. Examples of such absorbents include N-methyl pyrrolidone, dimethyl aniline, sulfolane, sulfinol (i.e., a mixture of sulfolane, diisopropanolamine and water), and the like. Of the foregoing, N-methyl pyrrolidone is preferred.

The absorbed sulfur dioxide is expelled from the absorbent by means of heating in a stripping zone. If water is used as absorbent, steam may be suitably used for stripping. In the case of absorbents other than water, the sulfur dioxide is generally expelled by indirect heating.

The process according to the invention is carried out in such a way that the sulfur dioxide-rich liquid absorbent is passed to a buffer zone between the absorption and stripping steps. A proper choice of the size of the buffer zone and/or control of the stream of liquid from the buffer zone to the heating zone can ensure that the fluctuating sulfur dioxide stream from the acceptance apparatus is converted into a constant sulfur dioxide stream to the Claus sulfur recovery process. In general, the buffer zone should be of a sufficient volume that the $SO_2$ concentration of the liquid absorbent contained therein will not change appreciably in spite of variations in the $SO_2$ concentration of the incoming liquid absorbent stream during the regeneration cycle. If desired, in lieu of employing a large buffer zone to level out the concentration changes, a smaller buffer zone may be employed and additional control of $SO_2$ concentration effected by controlling the rate of flow of absorbent from the buffer zone to the stripping zone. This can be accomplished by measuring the $SO_2$ concentration leaving the stripping zone and employing this measurement to adjust the flow rate of the sulfur dioxide-rich absorbent liquid withdrawn from the buffer zone, e.g., if the $SO_2$ concentration leaving the stripping zone decreases, the withdrawal rate from the buffer zone to the stripping zone would be increased thereby restoring the amount of $SO_2$ recovered from the $SO_2$ to its former level.

The regeneration off-gas from the acceptance process is preferably contacted with the liquid absorbent at a low temperature in order that as many as possible parts by weight of sulfur dioxide per parts by weight of absorbent will dissolve. On the other hand, this temperature will be so chosen that the process steps of cooling the off-gas, heating the absorbent and subsequently cooling this absorbent for re-use for absorbing sulfur dioxide do not lead to uneconomic measures with regard to the heat balance of the process. Suitable absorption temperatures generally lie in the range of between 10°–60° C and more preferably between 25°–50° C.

The pressure used during the absorption step is generally between 1 and 10 atmospheres and preferably between 1.3 and 6.5 atmospheres. Here again, the consideration applies that although more sulfur dioxide per unit of weight of absorbent dissolves at higher pressures, the pressure used should be economically acceptable.

The apparatus employed for the acceptance of sulfur oxides will hereinafter be referred to as an acceptance apparatus. Such an apparatus generally comprises at least two treating spaces which are used for acceptance according to the swing-method. The apparatus employed in the Claus process is hereinafter termed a Claus plant.

In the acceptance apparatus solid acceptors are used which are able to accept sulfur oxides and release them again in the form of sulfur dioxide on being regenerated. To this end carbon containing adsorbents may be used. In this case the sulfur oxides are retained as sulfuric acid in the pores of the adsorbent. After saturation of the adsorbent with sulfuric acid the carbon-containing adsorbent can be thermally regneerated at 400° to regenerated C with the exclusion of oxygen. This yields a sulfur-dioxide rich regeneration off-gas which also contains carbon dioxide, nitrogen and water vapor.

Other particularly suitable acceptors contain a metal and/or a metal compound on a suitable carrier. Preferred acceptors of this type contain copper and/or copper oxide as the metal and/or the metal compound. The carrier material used is preferably activated alumina such as gamma-alumina or a mixture of gamma- and alpha-alumina, although in principle all solids are suitable for use which are temperature-resistant and are not affected by sulfur oxides under the prevailing conditions. Examples of other suitable carriers include bauxite, silicaalumina, and silica-magnesia.

Acceptors consisting of copper and/or copper oxide on preferably active alumina as carrier are highly suitable for the removal of sulfur oxides from gases under oxidative conditions at temperatures above 300° C. Under the conditions in which sulfur dioxide is chemically bound by the acceptor, it has been found that sulfur trioxide is also removed from the gases and that hydrogen sulfide is oxidized to sulfur dioxide and subsequently accepted. Regeneration of these acceptors may be effected by means of a reducing gas.

The copper content of the acceptor may, partly depending on the specific surface area of the material used, vary within wide limits. As a rule it is 1 to 15 percent by weight, based on finished acceptor. Optimal results are obtained with acceptors which contain 4 to 10 percent by weight of copper.

The great advantage of acceptors which contain a metal and/or metal compound is that after loading with sulfur oxides with the formation of metal sulfate, they can be regenerated at the same or virtually the same temperature as that at which the acceptance took place. Operating at acceptance and regeneration temperatures which differ little from each other is not only advantageous from the point of view of heat economy, but is also of very great importance for the life of the acceptor. For an economically justified process it is necessary for the acceptor used to be capable of being regenerated several thousand times without the stability and activity deteriorating excessively. Such a long life will not be easy to achieve with acceptors which have to be heated and/or cooled at each regeneration through a relatively wide temperature range. The chemical and physical stability of the metal and/or metal compound containing acceptors may be considerably impared by this sort of temperature fluctuations.

The removal of sulfur compounds in the form of sulfur oxides, under oxidative conditions, i.e., in the presence of oxygen, is preferably effected at temperatures from 325° to 475° C. Regeneration under reductive conditions take place in the same temperature range. Preferably acceptance and regeneration are effected within this range at the same or virtually the same temperature.

The reducing gas used for the regeneration may be hydrogen and/or lower hydrocarbons or gas mixtures containing these compounds. The light hydrocarbons or mixtures thereof used may be methane, ethane, propane or technical grade mixtures such as natural gas or tops obtained during straight-run distillation of petroleum. If desired, these reducing gases may be used in dilution with steam. The use of steam as a diluent not only permits closer temperature control, but additionally prevents carbon deposition problems frequently encountered when hydrocarbons are used as the reducing gas.

As previously mentioned, it is necessary that hydrogen sulfide be added to the sulfur dioxide supplied to the Claus plant. The ratio of sulfur dioxide to hydrogen sulfide per unit of time should be substantially 1:2. Hence, the use of an acceptance process in combination with a Claus process is particularly attractive where a separate source of hydrogen sulfide is available. This will generally be the case at refineries where sulfur-containing petroleum products are desulfurized. The process according to the invention, however, also provides the possibility of application in cases where such a source is not available, as will be elucidated hereinafter. The latter is generally the case in power stations.

A major advantage of combined operation of an acceptance apparatus with a Claus plant is that the off-gases from the Claus plant, which still contain non-reacted hydrogen sulfide and sulfur dioxide, whether or not after combustion, may be returned to the acceptance apparatus, thus providing a closed system and making it unnecessary to discharge sulfur compounds to the atmosphere. If copper-containing or copper oxide-containing acceptors are used under oxidative conditions, hydrogen sulfide is also converted from the gases or gas mixtures fed to the acceptance apparatus. Therefore, incineration of the off-gases from the Claus plant is not necessary, although in some cases it may be desirable since the hot combustion gases from incineration can provide the temperature required for acceptance. For this purpose, the Claus off-gases after combustion are supplied to the acceptance apparatus together with a flue gas at a ratio of 0.02 to 1 part by volume of Claus off-gas per part by volume of flue gas.

The process as hereinbefore described will particularly be applied in those cases where hydrogen sulfide is available from another source, such as for example at refineries. The process may be adapted in a simple manner, however, for those locations where no independent source of hydrogen sulfide is available, for example, at power stations. Thus, in one embodiment of the invention at least part of the sulfur dioxide to be supplied to the Claus plant is catalytically reduced in the presence of a reducing gas before being introduced into the Claus plant. Preferably two-thirds of the quantity of sulfur dioxide added to the Claus plant is reduced in order to meet the stoichiometrical requirements of the reaction taking place in the Claus plant. To that end the sulfur dioxide stream may be divided into two streams, one of which is one-third of the total stream, and the second of which is two-thirds of the total stream. The second stream is passed over a reduction catalyst together with a reducing gas in order to reduce the sulfur dioxide to hydrogen sulfide, after which both streams, whether or not combined, are introduced into the Claus plant. However, it is also possible to pass the total sulfur dioxide stream over the catalyst and reduce the amount of reducing gas so that only two-thirds of the total quantity of sulfur dioxide is reduced to hydrogen sulfide. The resulting stream will then contain hydrogen sulfide and sulfur dioxide in the stoichiometrically required quantities.

Reduction of the sulfur dioxide stream to the Claus plant is effected preferably at temperatures above 180° C and more preferably at temperatures between 200° and 650° C dependent on the catalysts used and on the reducing agent. Very good results, using hydrogen and/or carbon monoxide, are obtained at temperatures in the range of from 220° to 450° C, while if methane is used as reducing agent temperatures from 450° to 600° C are preferred.

The pressure to be used for the reduction may be the pressure at which the sulfur-dioxide stream is obtained from the stripping zone. The hourly space velocity to be used during reduction is preferably 500 to 10,000 Nl of sulfur dioxide per liter of catalyst per hour.

The catalyst used for reduction of the sulfur-dioxide stream is preferably a sulfided Group VI and/or Group VIII metal-containing catalyst on an inorganic, oxidic carrier. The Group VI metal contained by these catalysts is preferably molybdenum, tungsten and/or chromium and the Group VIII metal is preferably a metal of the iron group, such as cobalt, nickel and/or iron. The inorganic, oxidic carrier used may be alumina, silica, magnesia, boria, zirconia, thoria or a mixture of two or more of these compounds. Very suitable reduction catalysts for the desired prupose are a $Ni/Mo/Al_2O_3$ or a $Co/Mo/Al_2O_3$ catalyst, which catalysts may be sulfided in a conventional manner before the reduction begins. Another very suitable reduction catalyst consists of a vanadium oxide applied to gamma alumina as carrier.

The process of the invention will now be further illustrated by reference to the accompanying drawings.

Referring now to the drawings, the embodiment shown in FIG. 1 is particularly suitable when water is used as the absorbent liquid and for operating at a somewhat elevated pressure.

In accordance with this embodiment, a regeneration off-gas from an acceptance apparatus containing sulfur dioxide, hydrogen and/or hydrocarbons, steam and carbon dioxide, is supplied through line 1 at a temperature of approximately 400° C and a pressure of approximately 1.3 atmospheres to cooler 2. Before the regeneration off-gas enters the cooler, it is mixed with part of the condensate formed during cooling which is introduced into line 1 through line 13. The condensate has a temperature of approximately 45° C and after introduction thereof into the regeneration gas the temperature of the gas drops to approximately 110° C. After cooling in cooler 2, the regneration gas which now has a temperature of 45° C is passed through line 3 to separator 4 where the formed condensate is separated from the gas phase. The regeneration off-gas is passed through line 5 to cooler 6 where it is further cooled, and then to compressor 7 where it is compressed to a pressure of approximately 4.5 atmospheres and passed into absorption column 12 equipped with buffer zone 14, via line 8. In the embodiment shown, buffer zone 14 comprises a bulbous lower portion of absorption column 12. However, it is not necessary that the buffer zone comprise part of the absorption column, but may be a separate vessel located anywhere between the absorption column and stripper column 18.

The condensate separated in separator 4 is discharged through line 9 and pump 10. After passing the pump the condensate stream branches into two parts, one part is added through line 13 to the regeneration off-gas to be cooled, as previously discussed, while the other part is supplied through line 11 to the compressed regeneration off-gas in line 8.

In the absorption column, the compressed regeneration off-gas is contacted counter-currently with water at a temperature of about 40° C which is introduced through line 28. The sulfur dioxide is absorbed in the water producing a substantially sulfur dioxide-free regeneration off-gas which leaves the absorption column via line 29, and a sulfur dioxide-rich aqueous solution which passes to buffer zone 14 and is commingled with the aqueous $SO_2$-containing solution already there present. A stream of the aqueous $SO_2$-containing solution having a temperature of about 45° C is withdrawn from buffer zone 14 through line 15 and is passed to stripper 18 via branch lines 16 and 17. The aqueous-$SO_2$ containing solution entering line 17 passes through heat exchanger 24 whereby its temperature is increased to approximately 83° C, and thereafter is passed into stripper 18. The aqueous $SO_2$-containing solution entering into line 16 is supplied to the top of stripper 18 and serves as an after-cooling stream.

In the stripper, the sulfur dioxide is expelled from the absorbent by means of steam at 5 atmospheres pressure and 150° C, supplied through line 19. The water discharged from the bottom of the stripper through line 21 and pump 22 is substantially free of sulfur dioxide and has a temperature of approximately 110° C. This hot water stream passes through heat exchanger 24 via line 23 where, as stated above, it enters into heat exchange with part of the colder SO-rich water, and subsequently passes through line 25 to cooler 26 wherein it is further cooled before being returned to the top of the absorption column via line 28. A slip stream of water may, if desired, be discharged from line 28.

The sulfur dioxide gas discharged through line 20 has a temperature of approximately 50° C and a pressure of 1.2 atmospheres and is saturated with water vapor. This stream is obtained at a substantially constant rate of flow and is highly suitable for processing in a Claus-type sulfur recovery process.

If further control of the sulfur dioxide gas stream passing to the Claus plant is desired, it is possible to measure the concentration of $SO_2$ passing through 20 and employing this measurement to regulate the withdrawal rate of the aqueous $SO_2$-containing solution from buffer zone 14 through line 15, i.e., the withdrawal rate of the $SO_2$-rich absorbent can be increased or decreased thereby increasing or decreasing the amount of absorbent passed to stripper 18 and consequently controlling the amount of sulfur dioxide gas passing through line 20.

Figure 2:
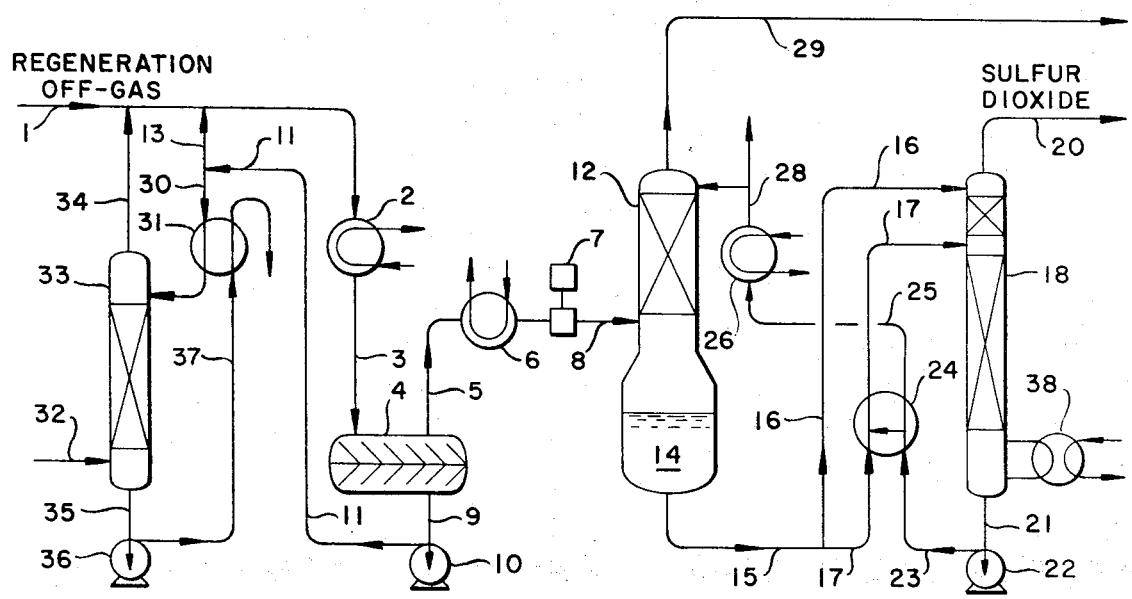
FIG. 2, is a flow diagram of an embodiment of the invention which is preferred when employing sulfur dioxide-selective liquid absorbents other than water.

The embodiment shown in FIG. 2 is particularly suitable for the use of liquid absorbents other than water. In this figure components identical to those of FIG. 1 are designated by the same reference numeral. In order to prevent water from coming into the absorbent, the $SO_2$-containing absorbent is heated by means of reboiler 38. The condensate formed during cooling of the regeneration off-gas is partly used for pre-cooling the regeneration off-gas as shown in FIG. 1, and partly discharged from the system. To that end it is passed through line 30 and heat exchanger 31 to stripper 33 which is supplied with steam by means of line 32. Any sulfur dioxide contained in the condensate is expelled from the condensate and passes though line 34 into line 1. Water which is substantially free of sulfur dioxide is discharged through line 37 via line 35, pump 36 and heat exchanger 31 in which the water enters into heat exchange with the part of the condensate supplied to column 33.

In the case shown, the absorption into the absorbent is effected under pressure. This is not necessary, however, and if desired, the compressor may be omitted and replaced by a circulation pump (not shown) in line 15. The $SO_2$-lean absorbent is introduced into the column 12 through line 28 as in the embodiment depicted in FIG. 1.

The process according to the invention will be further illustrated by means of the following example.

In an installation in accordance with the invention, sulfur dioxide is supplied to an acceptance apparatus by means of flue gas in a quantity corresponding with 10 tons of sulfur per day. An additional quantity of sulfur dioxide corresponding with 0.9 tons of sulfur per day is supplied from incineration of the off-gases from a Claus plant. Some sulfur dioxide corresponding with a quantity of 1.1 tons of sulfur per day remains behind in the desulfurized flue gas. A quantity of 9.8 tons of sulfur per day is supplied through line 1 with the regeneration off-gas to the apparatus for obtaining a constant sulfur dioxide stream depicted in FIG. 1. Sulfur dioxide is discharged in a quantity of 0.1 ton of sulfur per day with the absorption off-gas which leaves absorption column 12 through line 29, while a quantity of sulfur dioxide corresponding with 9.7 tons of sulfur per day is supplied through the line 20 to the Claus plant. Hydrogen sulfide is supplied to the Claus plant in a quantity corresponding with 19.4 tons of sulfur per day. 28.3 Tons per day of elementary sulfur is discharged from the Claus plant, while 0.9 tons of sulfur per day in the off-gases from the incinerator is returned to the acceptance process.

The total degree of desulfurization achieved is 96.3 percent.

We claim as our invention:

1. In a process for removing sulfur oxides from gas mixtures with a solid acceptor for sulfur oxides wherein the solid acceptor is regenerated with a steam-diluted reducing gas and the regeneration off-gas is passed to a Claus sulfur recovery process, the improvement which comprises:
   a. cooling the regeneration off-gas to a temperature at which a substantial part of the steam contained therein condenses,
   b. contacting the cooled regeneration off-gas with a sulfur dioxide-selective liquid absorbent thereby obtaining a substantially sulfur dioxide-free regeneration off-gas and a sulfur dioxide-rich liquid absorbent,
   c. passing said sulfur dioxide-rich liquid absorbent into a buffer zone of such a volume that the sulfur dioxide concentration of the liquid absorbent in the buffer zone will remain substantially constant during the regeneration period of the solid acceptor,
   d. withdrawing a stream of sulfur dioxide-rich liquid absorbent from said buffer zone and passing it to a stripping zone,
   e. heating the sulfur dioxide rich liquid absorbent to a temperature at which sulfur dioxide gas is expelled thereby regenerating the liquid absorbent, and
   f. recovering the expelled sulfur dioxide gas and passing it to a Claus sulfur recovery process at a substantially constant rate.

2. The process of claim 1 wherein part of the condensed steam is contacted with the regeneration off-gas to be cooled.

3. The process of claim 1 wherein the regeneration off-gas is contacted with the liquid absorbent at a temperature between 10°–60° C and a pressure of between 1 and 10 atmospheres.

4. The process of claim 1 wherein the liquid absorbent is N-methyl pyrrolidone, dimethyl aniline, sulfolane or a mixture of sulfolane, diisopropanolamine and water.

5. The process of claim 1 wherein the liquid absorbent is water.

6. The process of claim 5 wherein the absorbed sulfur dioxide is expelled from the liquid absorbent by means of direct heating with steam.

7. The process of claim 6 wherein part of the steam condensate is mixed with the cooled regeneration off-gas prior to contacting with the liquid absorbent.

8. The process of claim 5 wherein the regeneration off-gas is contacted with the liquid absorbent at a temperature between 25°–50° C and a pressure between 1.3 and 6.5 atmospheres.

9. The process of claim 1 wherein two thirds of the sulfur dioxide passed to the Claus sulfur recovery process is catalytically reduced to hydrogen sulfide.

10. The process of claim 1 wherein the off-gases from the Claus sulfur recovery process are returned to the acceptance process.

* * * * *